Patented May 4, 1937

2,079,463

UNITED STATES PATENT OFFICE 2,079,463

VAT DYESTUFFS OF THE ANTHRAQUINONE-AZINE SERIES

Joachim Mueller and Karl Koeberle, Ludwigshafen-on-the-Rhine, Germany, assignors to General Aniline Works, Inc., New York, N. Y., a corporation of Delaware No Drawing. Original application December 27, 1934, Serial No. 759,429. Divided and this application November 5, 1935, Serial No. 48,282. In Germany January 26, 1934

1 Claim. (Cl. 260—31)

The present invention relates to vat dyestuffs of the anthraquinone-azine series and a process of producing same.

This application has been divided out from our copending application Serial No. 759,429.

We have found that valuable vat dyestuffs of the anthraquinone-azine series can be obtained by treating ortho-amino-alpha-beta-dianthrimides corresponding to the formula

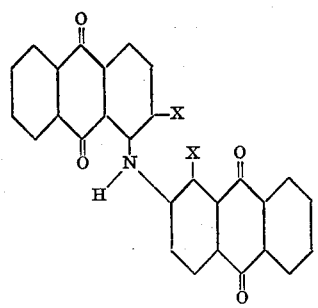

wherein one X stands for an amino group and the other X for hydrogen, with halogen or agents supplying halogen.

As initial materials may be mentioned not only the unsubstituted amino-dianthrimides of the said kind but also their substitution products, as for example those containing halogen or one or more alkyl groups in one or both of the anthraquinone nuclei, and especially those containing an alkyl group in the amino or imino group or both. When employing 1-methylamino-2.1'-dianthrimide, the reaction proceeds according to the following scheme:

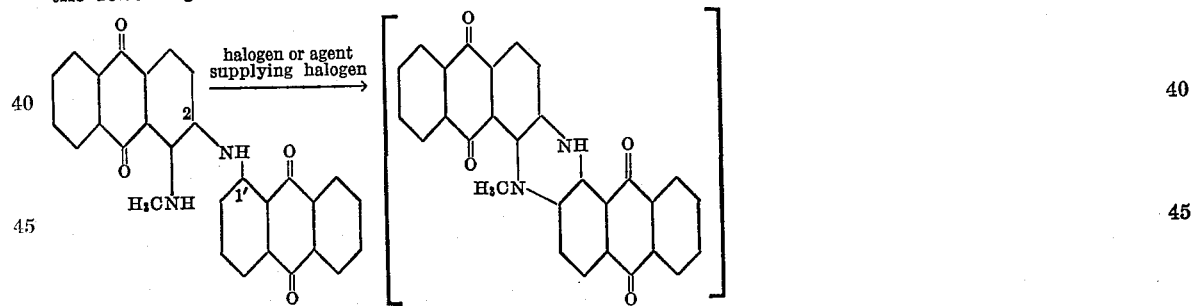

The treatment with halogen or agents supplying halogen may be carried out in organic or inorganic solvents or diluents, such as nitrobenzene, halogenated benzenes, as for example dichlorbenzene, glacial acetic acid, sulfuric acid or chlorsulfonic acid. The treatment may also be carried out, however, in the absence of diluents, for example by grinding the finely divided initial material with bromine in a ball mill. In many cases it is preferable to employ halogen transferrers, as for example iodine, sulfur or iron, during the reaction. As agents supplying halogen may be mentioned for example sulfur chloride, antimony pentachloride, iodine chloride, ferric chloride, sulfuryl chloride, benzoyl chloride and alkali metal halides, preferably bromides, or hydrogen halides in strong mineral acids, such as sulfuric acid or chlorsulfonic acid preferably in presence of oxidizing agents. In the said manner dyestuffs may also be prepared containing several different halogens, as for example by treating the initial materials with different halogens simultaneously or consecutively or by treating ortho-amino dianthrimides already containing halogen with a halogen different from that already present in the initial material.

The action of halogen or agents supplying halogen does not necessarily always result in a halogenation but in some cases only dehydrogenation with the formation of azines or hydroazines takes place. This is especially the case when the initial material already contains halogen. Thus, for example, when acting on a dibromo-ortho-amino-alpha-beta-dianthrimide with bromine under mild conditions a dibromo-anthraquinoneazine is obtained. Likewise by the action of benzoyl chloride on 1-methyl-amino-2.1'-dianthrimide in nitrobenzene N-monoalkyl-1.2.2'.1'-anthraquinoneazine is obtained. When, however, adding in the latter case a metal, in particular copper, to the reaction mixture chlorination takes place simultaneously, but such chlorination does not occur on the addition of iodine.

The products, in particular the halogen derivatives obtained according to this invention generally speaking differ in a very advantageous manner from the initial materials free from halogen in their greater color strength and in their substantially clearer shades of color and especially in the greatly improved fastness to chlorine of their dyeings. Thus, for example by treating 1-methyl-amino-2.1'-dianthrimide with sulfuryl chloride in nitrobenzene a chloro derivative is obtained which yields considerably stronger, clearer and more greenish dyeings than the initial material. These dyeings are far superior to those obtainable with the initial material free from chlorine as regards fastness to kier boiling and especially as regards fastness to chlorine.

The halogen derivatives are generally speaking obtained in very good yields and in a crystalline form. If necessary they may be purified or separated from any isomers formed, by the usual methods, as for example by way of their salts with strong acids, such as sulfuric acid. They dissolve in concentrated sulfuric acid usually giving an orange coloration and yield blue or green-blue vats, while the vats of the initial materials are brown. The leuco derivatives, as for example the leuco esters, may be prepared from the halogen derivatives in the usual manner.

The following examples will further illustrate how the said invention may be carried out in practice but the invention is not restricted to these examples. The parts are by weight.

*Example 1*

10 parts of the anthrimide derived from 1-methylamino-2-bromanthraquinone and 1-amino-4-hydroxyanthraquinone are heated for 6 hours at 100° C. while stirring after an addition of 30 parts of bromine. After cooling, the whole is filtered by suction or the solvent is removed by distillation, if desired with the aid of steam. The resulting reaction product containing bromine is a blue-green crystallized powder which yields a clear greenish blue vat from which vegetable fibres are dyed green-blue shades of very good fastness properties.

If 10 parts of the anthrimide derived from 1-amino-2-bromanthraquinone and 1-amino-4-hydroxyanthraquinone be employed as initial material, a reaction product containing bromine which likewise gives a blue vat is obtained; it yields clear green-blue dyeings having very good fastness properties on vegetable fibres.

*Example 2*

10 parts of the anthrimide derived from 1-amino-2-bromanthraquinone and 1-amino-4-hydroxyanthraquinone are heated for 3 hours at 75° C. in 100 parts of nitrobenzene after an addition of 1 part of iodine and 15 parts of sulfuryl chloride, and then for another 2 hours at 85° C. The whole is allowed to cool and the reaction product is isolated as described in Example 1. It is obtained in the form of blue needles which yield a greenish blue vat from which vegetable fibres are dyed blue shades of very good fastness properties.

By employing chlorine as the chlorinating agent instead of sulfuryl chloride, a reaction product having similar properties is obtained. If the chlorination be carried out with chlorine at temperatures above 100° C., the reaction product is obtained in the form of its azine.

*Example 3*

A mixture of 10 parts of the anthrimide employed in Example 2, 150 parts of nitrobenzene and 30 parts of bromine is heated at 100° C. for 6 hours while stirring. After cooling, the reaction product is filtered off by suction. It is a blue crystalline powder which dissolves in concentrated sulfuric acid giving a green coloration. It dyes vegetable fibres green-blue powerful clear shades from a blue vat. According to analysis it is a dibromo derivative which is probably 3.3'-dibrom-4-hydroxyanthraquinone-dihydroazine.

*Example 4*

100 parts of 1-methylamino-2.1'-anthrimide which is obtained by treating 1-amino-2.1'-anthrimide with methylating agents (for example with a solution of para-toluene sulfonic acid methyl ester in trichlorbenzene, dimethylsulfate or a mixture of methanol and sulfuric acid) are introduced into 1000 parts of nitrobenzene. After adding 150 parts of bromine, the mixture is heated, while stirring, at 100° C. for several hours. In order to complete the reaction the temperature is after 1 to 2 hours raised to about 170° C. After cooling and working up, a blue crystalline powder is obtained which dyes vegetable fibres powerful clear blue shades from a blue vat. The dyestuff is a dibromo derivative according to analysis.

If the corresponding ethyl or butyl amino anthrimide is employed instead of the said methyl amino anthrimide bromo derivatives are obtained which likewise yield blue dyeings on vegetable fibres from blue vats.

*Example 5*

10 parts of the anthrimide obtainable by condensing 1-methylamino-2-bromanthraquinone with 1.4-diaminoanthraquinone are mixed with 100 parts of nitrobenzene, 20 parts of bromine and 1 part of iodine. The mixture is then heated at 120° C. for several hours while stirring. After cooling, the blue crystals of 4'-amino-3.3'-dibrom-N-methylanthraquinone-dihydroazine are filtered off by suction. The dyestuff dissolves in concentrated sulfuric acid giving a green coloration. It dyes vegetable fibres from a blue-green vat green shades of excellent fastness to light.

In a corresponding manner 1-amino-2.1'.4'-amino-anthrimide is converted into a 3.3'-dibrom-4'-aminoanthraquinone-dihydroazine which dissolves in concentrated sulfuric acid giving a green coloration and which dyes vegetable fibres green shades from a blue-green vat. By employing 1.5 parts of sulfuryl chloride dissolved in nitrobenzene a blue-green crystalline dichloro derivative is obtained which dissolves in concentrated sulfuric acid giving an olive coloration. It dyes vegetable fibres from a blue-green vat bluish-green shades of very good fastness.

*Example 6*

A mixture of 100 parts of 4'-benzoylamino-1-amino-2.1'-anthrimide, 1000 parts of nitrobenzene and 200 parts of bromine is heated in the presence of 1 part of iodine at from 125° to 130° C. for several hours while stirring. As soon as hydrogen bromide is no longer evolved, the mixture is allowed to cool. The 3.3'-dibrom-4'-benzoylaminoanthraquinone-dihydroazine formed is then filtered off by suction. It is a blue-green powder which dissolves in concentrated sulfuric acid giving a brown coloration. It dyes vegetable fibres from a blue vat blue-green shades of very good fastness.

If 2-amino-4'-benzoylamino-1.2'-anthrimide is employed instead of the beforementioned anthrimide a dyestuff is obtained which yields similar shades on animal fibres.

What we claim is:

4'-benzoylamino-3.3'-dibromanthraquinone-dihydroazine forming a blue-green powder dissolving in concentrated sulfuric acid giving a brown coloration dyeing vegetable fibres blue-green shades from a blue vat.

JOACHIM MUELLER.
KARL KOEBERLE.